(12) United States Patent
Fellner

(10) Patent No.: US 7,124,541 B2
(45) Date of Patent: Oct. 24, 2006

(54) CURVED VEHICLE DOOR HAVING A FUNCTION CARRIER PROVIDING SIDE IMPACT PROTECTION

(76) Inventor: Gerald Fellner, Nussbaumstrasse 4 D-85757, Karlsfeld (DE)

( * ) Notice: Subject to any disclaimer, the term of this patent is extended or adjusted under 35 U.S.C. 154(b) by 0 days.

(21) Appl. No.: 10/433,672

(22) PCT Filed: Dec. 6, 2001

(86) PCT No.: PCT/EP01/14346

§ 371 (c)(1),
(2), (4) Date: Jun. 5, 2003

(87) PCT Pub. No.: WO02/45987

PCT Pub. Date: Jun. 13, 2002

(65) Prior Publication Data

US 2004/0060240 A1 Apr. 1, 2004

(30) Foreign Application Priority Data

Dec. 6, 2000 (DE) ................................ 100 60 632

(51) Int. Cl.
*B60J 5/04* (2006.01)
(52) U.S. Cl. ............................ 49/502; 49/349; 49/374; 49/352; 296/146.6
(58) Field of Classification Search .................. 49/502, 49/348, 349, 374, 352; 296/146.6, 146.5
See application file for complete search history.

(56) References Cited

U.S. PATENT DOCUMENTS

| | | | | |
|---|---|---|---|---|
| 3,834,080 A * | 9/1974 | Lystad | ......................... | 49/348 |
| 3,844,064 A * | 10/1974 | Yamaha et al. | ............... | 49/348 |
| 3,964,208 A * | 6/1976 | Renner et al. | ................ | 49/502 |
| 4,860,496 A * | 8/1989 | Hellriegel | ..................... | 49/502 |
| 4,934,099 A * | 6/1990 | Maekawa et al. | ............. | 49/352 |
| 4,969,680 A * | 11/1990 | Shimoda | ................... | 296/146.6 |
| 5,018,305 A * | 5/1991 | Kuki et al. | ..................... | 49/348 |
| 5,142,824 A * | 9/1992 | Le Compagnon et al. | .... | 49/349 |
| 5,536,060 A * | 7/1996 | Rashid et al. | ............ | 296/146.6 |
| 5,595,415 A * | 1/1997 | Beaulat | ...................... | 296/39.1 |
| 5,762,394 A * | 6/1998 | Salmonowicz et al. | .. | 296/146.5 |
| 5,924,760 A * | 7/1999 | Krajewski et al. | ....... | 296/146.6 |
| 5,944,373 A * | 8/1999 | Seksaria et al. | ........... | 296/57.1 |
| 6,038,911 A | 3/2000 | Krajewski et al. | | |
| 6,086,133 A * | 7/2000 | Alonso | ...................... | 296/97.8 |
| 6,119,400 A * | 9/2000 | Ovenshire | .................... | 49/352 |

(Continued)

FOREIGN PATENT DOCUMENTS

DE 4237584 A1 5/1994

(Continued)

Primary Examiner—Gregory J. Strimbu
(74) Attorney, Agent, or Firm—Takeuchi&Kubotera, LLP

(57) ABSTRACT

A curved vehicle door having a correspondingly curved windowpane and a correspondingly curved function carrier on which all of the add-on parts and door coverings are held and which can be used as protection for the occupant in the event of a lateral crash against the door. The function carrier is constructed in a sandwich-like manner from at least two shell bodies each having one of horizontal and vertical stiffening sections, the stiffening sections forming crossing points for fastening the shell bodies to each other so that the shell bodies form together a continuously closed frame of the function carrier. The outer shell body forms the curved outer side of the function carrier having at least two parallel grooves for accommodating a window lifting and lowering device which has a curvature matched to the curvature of the vehicle door.

8 Claims, 8 Drawing Sheets

U.S. PATENT DOCUMENTS 6,425,208 B1 * 7/2002 Klueger et al. .............. 49/502

FOREIGN PATENT DOCUMENTS

| | | | |
|---|---|---|---|
| DE | 19801842 A1 | 7/1999 | |
| EP | 0940297 A2 | 9/1999 | |
| WO | WO 00/15454 | 3/2000 | |

* cited by examiner

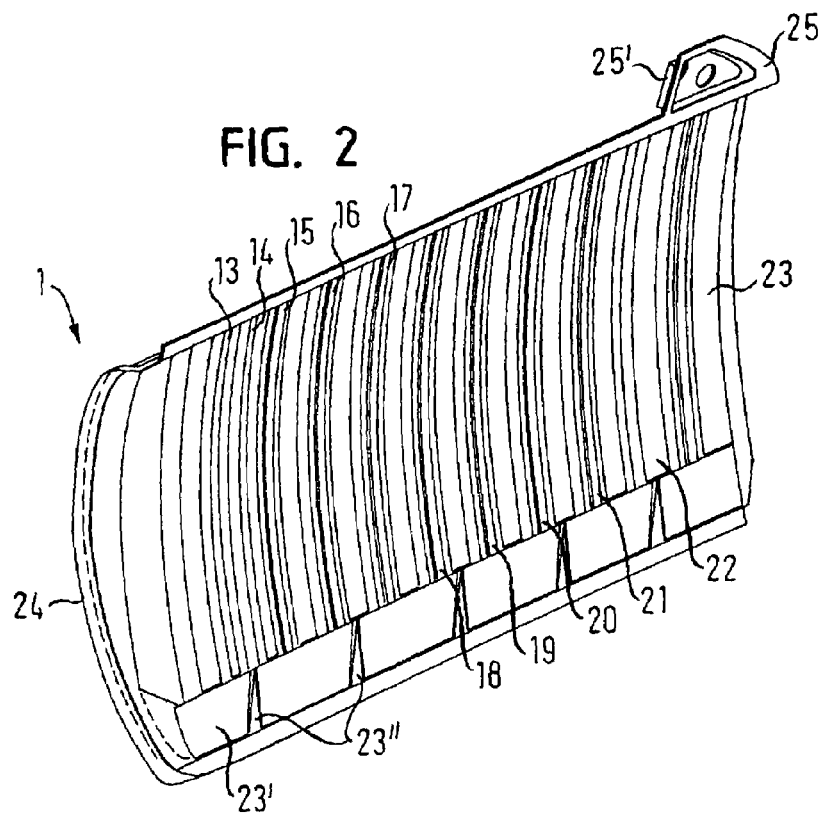
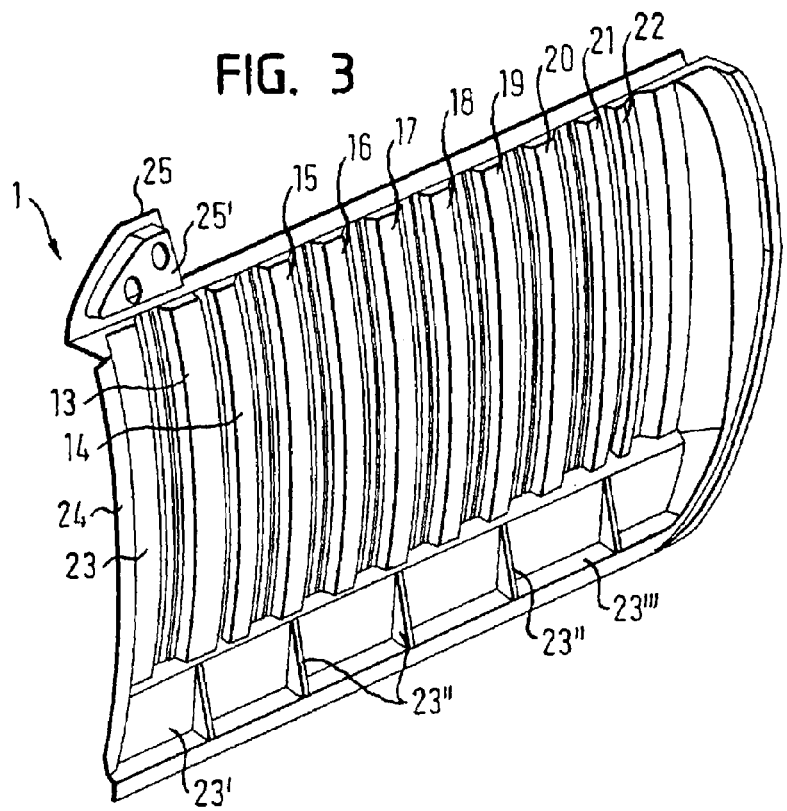

CURVED VEHICLE DOOR HAVING A FUNCTION CARRIER PROVIDING SIDE IMPACT PROTECTION

BACKGROUND OF THE INVENTION

The invention relates to an outwardly curved vehicle door, in particular for motor vehicles having a correspondingly curved side windowpane.

In the prior art, the central supporting element forming the function carrier of a passenger vehicle or truck door consists of a deep-drawn steel sheet having a material thickness of between 0.8 and 1.2 mm. Although the steel sheet forms an encircling, closed edge, the supporting steel sheet has to have relatively large apertures and cutouts for installation work on the door lock, on the windowpane, on the lifting mechanism for the windowpane and on other add-on parts of the door. These necessary apertures and cutouts in the steel sheet reduce the stability of the door in the event of a crash and are the reason for relatively low strength values in all load situations. Moreover, the large cutouts in the region of the outer door covering mean that water easily penetrates, which can be prevented only to an unsatisfactory extent by sealing films and cannot be prevented sufficiently reliably in the long term. In addition, the relatively large cutouts in the supporting steel sheet necessitate complex means for fastening the door add-on parts making relatively large tolerances necessary in regard to the securing of the door coverings. The installation of conventional vehicle doors is particularly complex and time-intensive, since all of the accessory parts have to be assembled by hand on the manufacturing assembly line and are difficult to gain access to on the supporting steel sheet. In order largely to be able to counteract the deficient stability of the steel sheet as the function carrier of the conventional vehicle doors, special reinforcements have to be provided which protrude relatively far out of the plane of the steel sheet, as a result of which the known vehicle doors constitute a particularly bulky structural body which requires an unsatisfactorily large structural space between the door outer covering or the outer skin and the function carrier.

This relatively large structural space of the vehicle door, which is curved outward to a greater or lesser extent and has a particularly large structural depth or strength, is necessitated by the curvature of the door and the correspondingly curved side windowpane which is connected to a window lifting and lowering system which, in the prior art, comprises a scissors-type mechanism or a device having a control cable, it being possible for these known window lifting and lowering systems to be operated by motor. In this case, however, the known systems take up a necessarily uncurved section of space within the curved door over the height of the complete window closing and opening path, which means in many cases taking up up to 60 mm in spatial depth which could be saved if there were a window lifting and lowering system which does not require an uncurved section of space within the curved vehicle door with its correspondingly curved side window and at the same time may also be provided with a drive by motor.

SUMMARY OF THE INVENTION

The object of the invention is to specify a curved vehicle door of the type mentioned at the beginning which avoids the disadvantages of the known vehicle doors and in addition can provide the occupants with increased safety in the event of a crash, but also in militant assaults. For this purpose, the function carrier of the vehicle door is to have considerably improved stability and stiffness and is largely free from apertures and cutouts, thus rendering additional reinforcement on the function carrier superfluous In addition, the penetration of water into the interior of the door is to be permanently prevented without complicated sealing precautions, and the fastening and attachment of functional and add-on parts to the function carrier is to be made a lot easier with a reduced expenditure of time and with a substantially reduced amount of structural space in comparison with the prior art, an uncurved section of space within the curved door for accommodating a window lifting and lowering system for the correspondingly curved side windowpane being omitted. The intention is also for the vehicle door to be preassembled essentially completely by robot, so that the finished function carrier of the vehicle door together with add-on parts can be supplied to the assembly line.

The invention is based on the concept of departing from the conventional solutions for a curved vehicle door with a deep-drawn steel sheet having relatively large apertures and cutouts as function carrier for a side window lifting and lowering system and, in order to increase the vehicle occupant safety and to facilitate the installation, of specifying a basically new, correspondingly curved function carrier for the vehicle door consisting of steel and/or aluminum and/or plastic, said function carrier being provided in each case along curved, parallel lines in at least two curved, parallel planes with stiffening sections. In this case, it is particularly advantageous if stiffening sections of planes lying directly adjacent form crossing points.

The invention is based on the further concept of substantially shortening the depth required for a curved vehicle door in comparison with the known curved vehicle doors by the use of a side window lifting and lowering system that is matched to the curvature of the vehicle door and its correspondingly curved side window.

In this case, it may be particularly advantageous if the stiffening sections in the function carrier planes lying adjacent form an angle of 90° in the crossing points.

The stiffening sections may advantageously be formed by rib/groove profiles or the like. The stiffening sections along parallel lines may also comprise rib/groove profiles which are interrupted at distances. Instead of the rib/groove profiles along straight lines, humps and dents following one another in an alternating manner may also be suitable. In the case of plastic function carriers, the stiffening sections may consist of strands of fiber, preferably strands of glass fiber, along parallel lines in the function carrier planes lying adjacent. The parallel lines may run in a straight line or in a wavy manner along a straight line.

One development based on the abovementioned concept of the invention is that the function carrier of the vehicle door, which support is curved in accordance with the curvature of the door and window, is composed in a sandwich-like manner from at least two flat, curved shell bodies, each shell body having a washboard-like, ribbed profile structure, which run at right angles to one another and come into contact with one another on both sides at inner crossing points and, at the same time, form locations of fixed connections which can be welded, bonded, riveted or clinched to one another in order to obtain a stable unit for the function carrier which is composed in a sandwich-like manner from at least two curved shell bodies. In the case of two shell bodies made from metal, spot welds at the crossing points may be particularly advantageous without the invention being limited to such a type of connection.

The edges of the shell body bearing against one another in a sandwich-like manner together advantageously form an encircling frame which is self-contained and is sealed against the entry of water.

A function carrier according to the invention may consist of curved metal sheets or plastic plates, parts of the parallel stiffening sections of the outer shell body being used as guides for side window lifting and lowering systems according to the invention, but said guides do not necessitate a sandwich-type construction of the curved function carrier that particularly increases the safety in the event of a crash and so the side window lifting and lowering system according to the invention may also be implemented on a curved, single-shell function carrier which is provided with a profile used in part for guiding the side window lifting and lowering device according to the invention.

BRIEF DESCRIPTION OF THE DRAWINGS

The invention will furthermore be described in greater detail with reference to an exemplary embodiment which is illustrated merely schematically, without any restriction, in a drawing, in which:

FIG. 2 shows a perspective interior view of the curved, outer shell body according to FIG. 1;

FIG. 3 shows a perspective exterior view of the curved, outer shell body according to FIG. 1;

DESCRIPTION OF THE PREFERRED EMBODIMENTS

Figure 1:
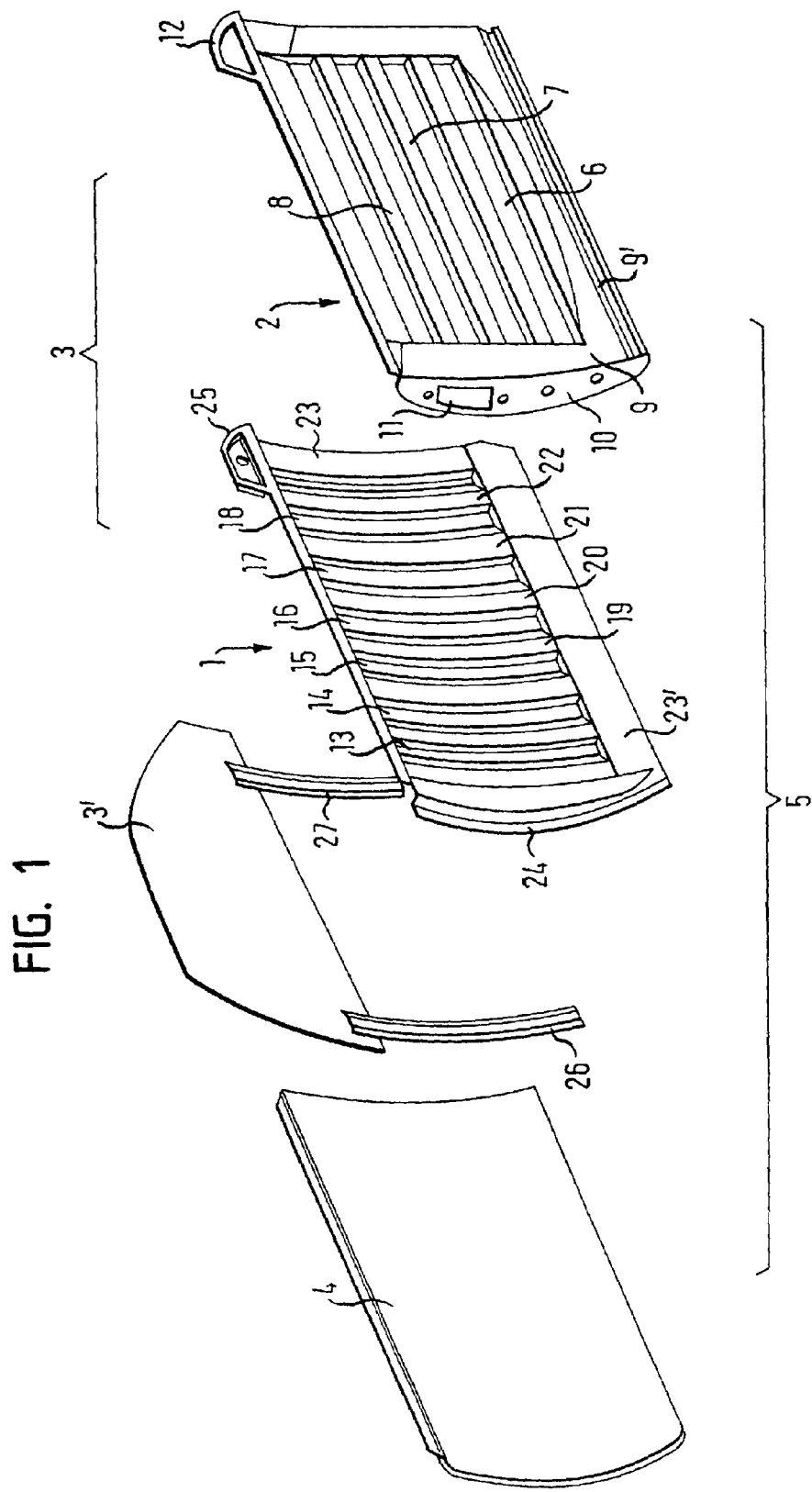
FIG. 1 shows a function carrier according to the invention which is composed of two curved shell bodies for a curved vehicle door together with an associated, correspondingly curved side windowpane and an outer covering (outer skin), in each case in perspective illustrations.

FIG. 1 shows a function carrier 3 according to the invention which is composed of two individual, flat, curved shell bodies 1 and 2, and an associated, correspondingly curved windowpane 3' and a door outer covering or outer skin 4, in each case in a perspective illustration, which together form a curved vehicle door 5 according to the invention, without its inner covering, for example for a passenger vehicle.

The two curved, individual shell bodies 1 and 2 consist, for example, in each case of aluminum and/or steel sheet with a thickness of in each case approximately 0.4 mm to 0.6 mm or of preferably glass-fiber-reinforced plastic, the sheet or plastic being bonded together in a sandwich-like manner to form the function carrier body 3 with a thickness of approximately 1 to 2 mm.

One of the two shell bodies 1 or 2 may also consist of a fiber-reinforced plastic and the other of an aluminum or steel sheet which are connected fixedly to each other in a sandwich-like manner.

The two shell bodies 1 and 2 which are in each case curved outward, as seen from the vehicle, may consist of deep-drawn aluminum or steel sheets. The inner shell body 2 has, in the central region, a longitudinal stiffening section consisting of parallel, horizontal ribs 6, 7, 8, and 9 which are connected to a frame 10, which is closed on all sides, of the shell body 2 having, at its front end, a surface section 11 which is outwardly angled rectangularly and curved outward in the longitudinal direction. The surface section 11 has an opening 11' in order to accommodate the door lock (not shown here). The closed frame 10 of the inner shell body 2 has, at its rear end, a projecting profile 12 for connection to the hinge (not shown here) of the door.

The frame 10 of the curved, inner shell body 2 has, in the bottom region, a continuous longitudinal profile 10' which is matched to the stiffening section of the free longitudinal member 32 (not shown here) which is angled upward in an L-shaped manner, is at the bottom end (FIG. 9) and on which the two-shell function carrier 3 of the vehicle door 5 is supported.

The outer, curved shell body 1 has transverse stiffening sections comprising parallel ribs 13 to 22 which, for their part, are connected to a frame 23 which is likewise closed on all sides. At its front end, the frame 23 has a comparatively narrow connecting profile 24 and, at its rear end, the frame 23 has a projecting profile 25 which is matched spatially to the profile 12 at the rear end of the correspondingly curved, inner shell body 2 for stiffening purposes and which together form a reinforced connecting profile for the door hinge (not shown here).

The transverse stiffening sections 13 to 22 of the outer shell body 1 end at a distance from its lower bottom edge, thus forming at the bottom end a substantially wider, central frame section 23' which is further stiffened on the inside and outside by respective vertical webs 23" and 23'" (FIGS. 2 and 3) which are distributed uniformly in the longitudinal direction over the bottom edge and lie opposite one another in pairs on the inside and outside. On the inside and outside, the webs are connected with widened sections to a widened, horizontally widened bottom surface 23''''.

The two frames 10 and 23 of the two shell bodies are designed with respect to one another in such a manner that their outer edge sections mutually overlap in order together to form a frame which is closed on all sides and is sealed against the entry of water for the two-part function carrier 3 of the vehicle door 5 which is constructed in a sandwich-like manner, is stabilized by longitudinal and transverse stiffening sections and is curved in accordance with the curvature of the vehicle door.

The transverse stiffening sections 13–22 of the outer shell body 1 cause the formation on its outer side of in each case two parallel transverse grooves 14 and 22 (FIG. 8) in which the u-shaped window guiding rails 26 and 27 (FIG. 1) engage with play for displacement of the curved window-pane 3' (FIG. 12), as is described more specifically below.

The curved, outer shell body 1 is profiled on its outer edge region in such a manner that the correspondingly curved outer skin 4 (FIG. 1) can be connected with a small distance from the outer surface of the outer shell body 1. The shaft-shaped installation space 37 (FIG. 9) which is provided as a result for insertion of the preassembled window lifting and lowering system, which is curved in accordance with the curvature of the window, from above into the installation space 37, which is likewise correspondingly curved, can advantageously be designed to be particularly narrow. More space is then particularly advantageously available for the door inner covering 28 (FIG. 8), as is clarified in greater detail below with reference to FIGS. 10 to 13.

FIG. 2 shows the perspective interior view of the curved, outer shell body 1 which faces the perspective exterior view of the shell body 1 in FIG. 3. The hinge-connecting profile 25 at the rear end of the outer shell body 1 bears a profiled stiffening section 25' for connection to the hinge (not shown here).

Figure 4:
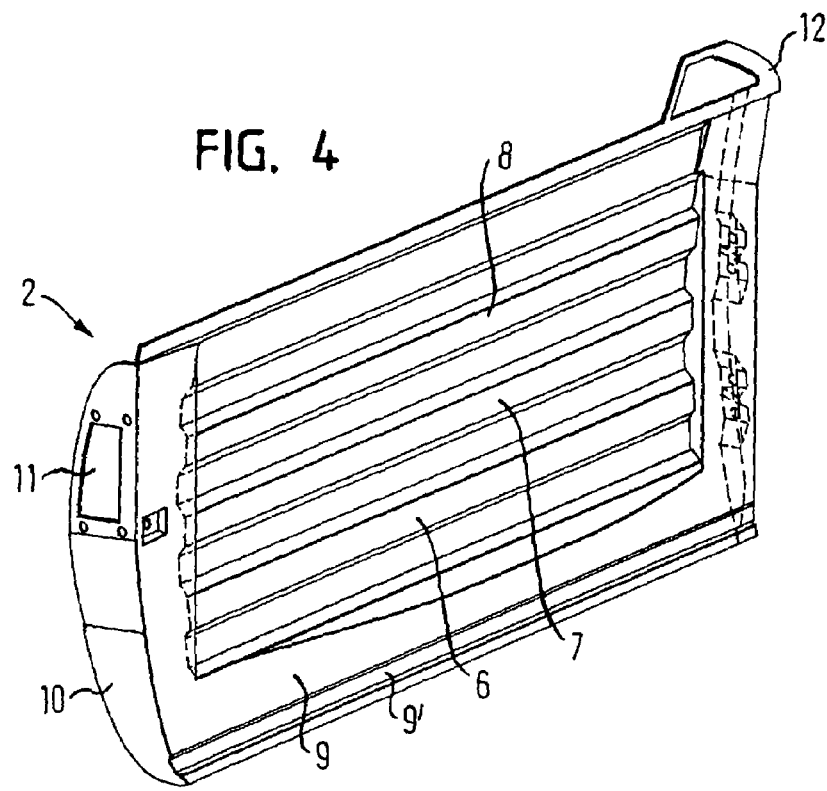
FIG. 4 shows a perspective interior view of the curved, inner shell body according to FIG. 1.
Figure 5:
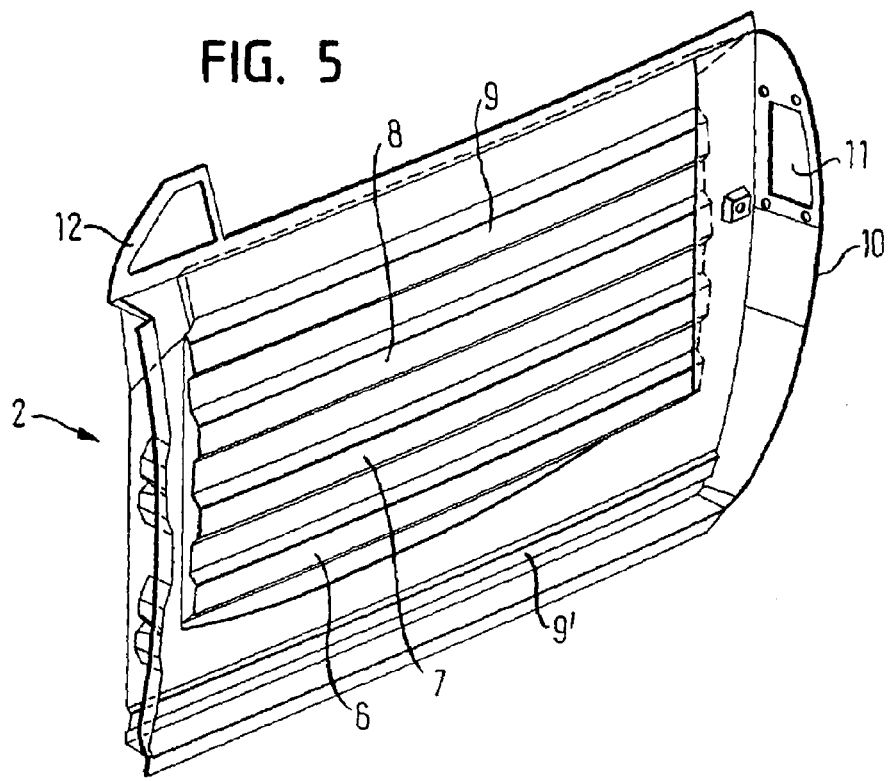
FIG. 5 shows a perspective exterior view of the curved, inner shell body according to FIG. 1.

In contrast, FIG. 4 shows the perspective interior view of the correspondingly curved, inner shell body 2 which faces the perspective exterior view of the shell body 2 in FIG. 5.

FIGS. 2 and 3 and 4 and 5 show that the two shell bodies 1 and 2 each have on the outside and inside intersecting parallel longitudinal and transverse stiffening sections which are designed, for example, as rib structures here. However, in principle, other stiffening sections which act in an identical manner and form right angles at the crossing points are possible.

FIG. 1 illustrates the fact that the two shell bodies 1 and 2 are placed on each other in a sandwich-like manner in order to form the two-part, curved function carrier 3. In this case, the horizontal stiffening sections of the inner shell body 2 and the vertical stiffening sections of the outer shell body 1 form crossing points at which the mutually facing rib profiles on both sides come into contact.

At all of the crossing points or at particularly selected crossing points, the two shell bodies 1 and 2 are welded to each other (preferably spot-welded) or are bonded or riveted or clinched in order thereby to fixedly connect the two shell bodies 1 and 2 to each other to form the function carrier 3, which is of curved design corresponding to the curved vehicle door and the side window 3'.

Figure 6:
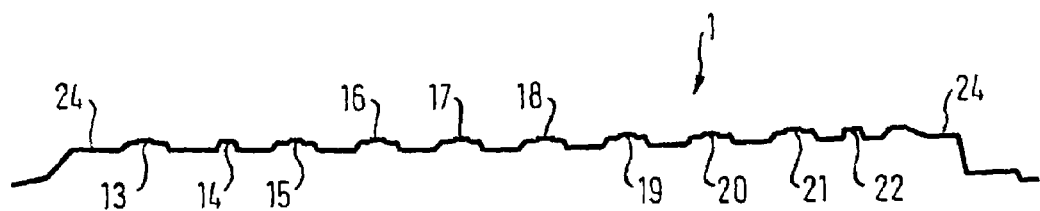
FIG. 6 shows a horizontal section through the outer shell.
Figure 7:
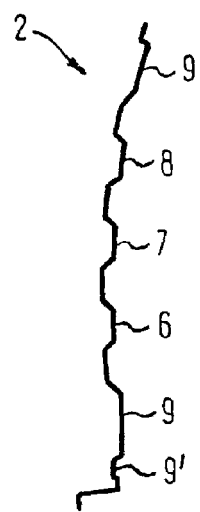
FIG. 7 shows a vertical section through the inner shell body.

FIG. 6 shows a horizontal section through the outer shell body 1 with a rib-shaped structure, and FIG. 7 shows a vertical section through the inner shell body 2, which likewise has a rib-shaped structure.

Figure 8:
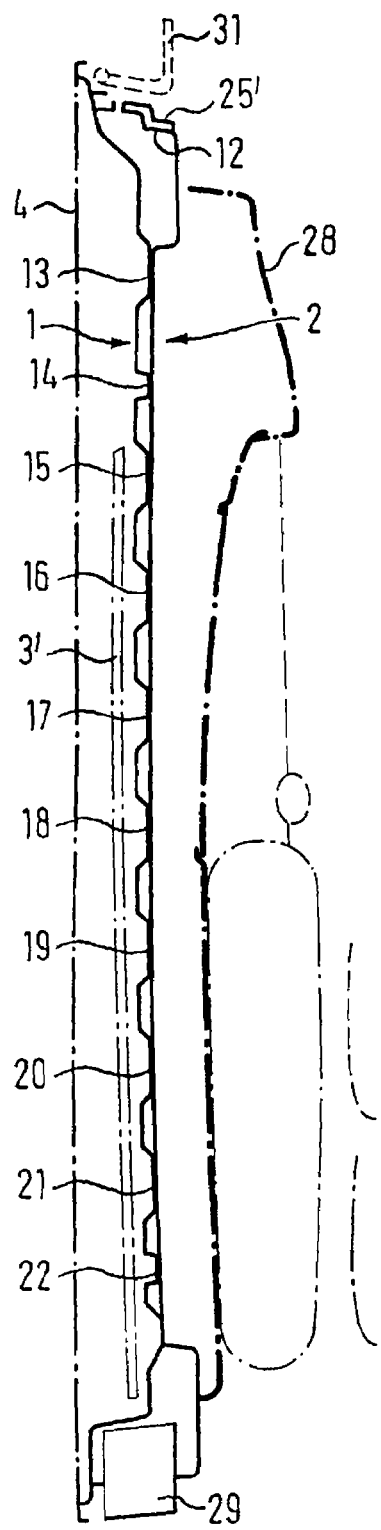
FIG. 8 shows a horizontal section through a curved vehicle door according to the invention with a correspondingly curved side window.

FIG. 8 shows a horizontal section through the outwardly granulated vehicle door 5 according to the invention, the outer skin 4 (indicated by chain-dotted lines), the window 3' (indicated by chain-dotted lines) and the function carrier 3 which is constructed in a sandwich-like manner from the outer and the inner shell bodies 1 and 2, an inner door covering 28 (indicated by chain-dotted lines) on the inner shell body 2 being retained in an exemplary formation which is merely indicated in FIG. 8.

In FIG. 8, the door lock is referred to by 29 and is inserted into the recess 11' on the front end surface of the inner shell body 2 and is adjacent on the rear side to a profiled section of the outer shell body 1. The door lock 29 is therefore used for additionally stiffening the two shell bodies 1 and 2 in the region of the front end surface of the vehicle door 5.

The rear end of the door with the hinge fastening profiles 12 and 25 and the profiled stiffening section 25' on the shell bodies 1 and 2 is screwed onto a hinge 31 in a conventional manner.

Figure 9:
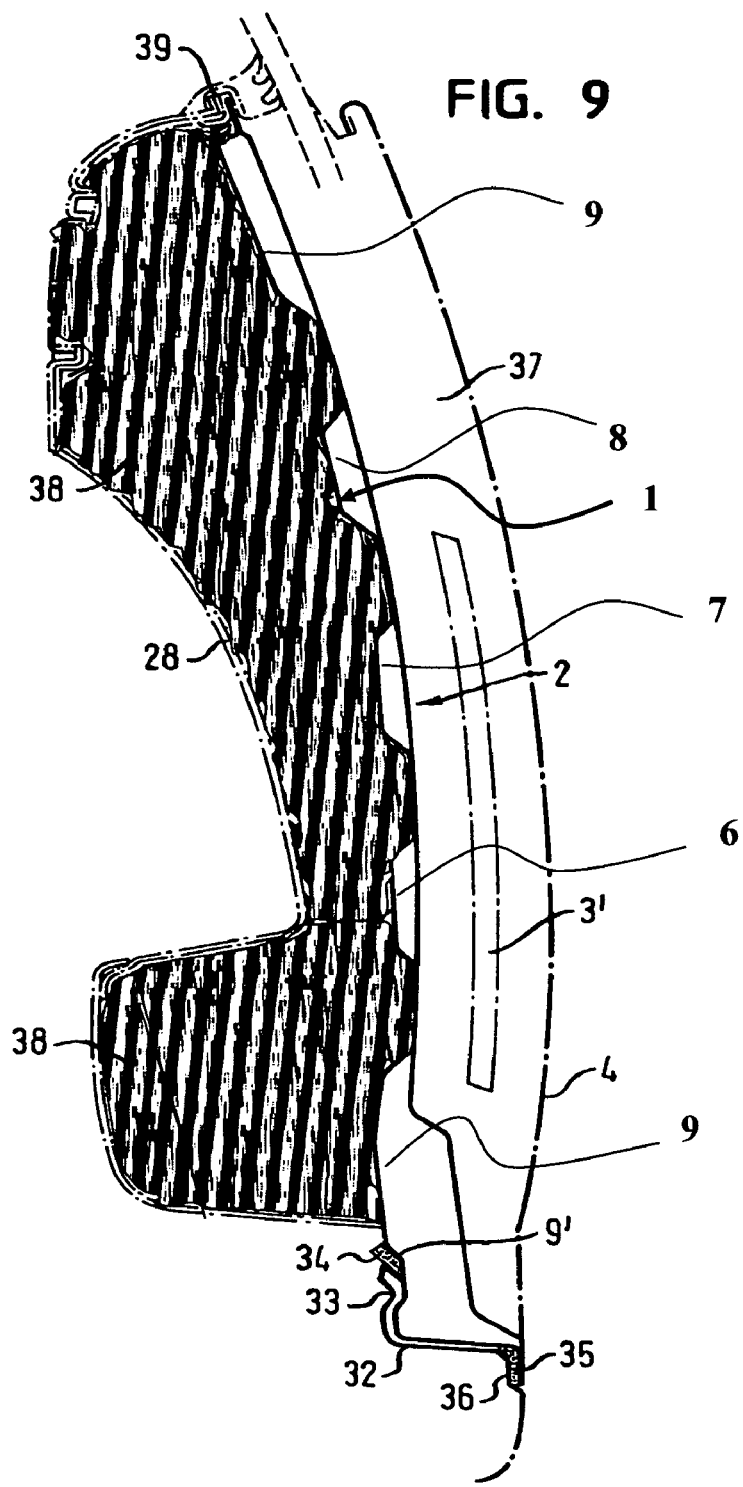
FIG. 9 shows a vertical section through the vehicle door according to FIG. 8.

FIG. 9 shows a vertical section through the outwardly curved vehicle door 5 according to the invention with the two shell bodies 1 and 2, the correspondingly curved side window 3' of the outer skin 4 (indicated by broken lines) and the inner door covering 28. The L-shaped longitudinal member at the bottom end of the vehicle door is referred to by 32, the stiffening section 33 of which longitudinal member engages at the inner, upper end in the groove-shaped longitudinal profile 9' on the bottom of the frame 10 of the shell body 2. A first sealing strip 34 is inserted into the free gap between the end of the stiffening section 33 of the longitudinal member 32 and the groove-shaped longitudinal profile 10'. A further sealing strip 35 is situated between the outer, downwardly bent away end 36 of the longitudinal member 32 and the outer skin 4, which is supported on its bent away end 36. Water can thus penetrate from the outside at any time into the structural space 37 between the outer skin 4 and the outer shell body 1, but not into the region of the door covering 28 and not into the space between the two shell bodies 1 and 2, which form an encircling tightly closed frame at their outer edges, it being possible for the shaft-shaped structural space 37 for the insertion of the ready-assembled window lifting and lowering device to be designed in conjunction with the window and upper shaft covering 53 (FIGS. 10 and 13) to be particularly narrow in comparison with the prior art. The space 38, which is completely protected from moisture, between the inner shell body 2 and the inner door covering 28 may therefore advantageously also be of comparatively large configuration, which results in a substantial gain in space for the passenger compartment.

The inner door covering 28 has, at its upper end, an edge 39 which engages over the upper end of the frame of the function carrier 3 composed of the two shell bodies 1 and 2, thereby advantageously making a fitting strip which is otherwise necessary in the prior art for the inner door covering 28 superfluous.

The comparatively large free space 38 between the inner switching body 2 and the door covering 28 can advantageously be used as a storage space, for example map pocket, etc. and/or to accommodate energy-absorbing materials (for example, PUR) for a crash situation.

In the event of a crash, the vehicle door 5 according to the invention with its double-shell function carrier 3 has particularly high stability. The function carrier 3 with its continuously closed edge region comprising the two spot-welded shell bodies 1 and 2 which have deep-drawn longitudinal and transverse stiffening sections has particularly high strength values in all load situations and can easily be further stabilized if required by means of additional support profiles.

The double-shell function carrier 3 which is closed at the edges does not permit water to penetrate into the region of the inner door covering 28. If the window lifting motor is held, for example, on the inner side of the inner shell body 2, its drive shaft can easily be sealed in a completely water-tight manner in the shaft 37.

The inner door covering 28 can be fastened in a particularly simple manner to the function carrier, for example to the upper edge thereof.

The installation of the add-on parts of the function carrier proves to be particularly simple. The lock 28, the window lifting and lowering device 42 etc. can be preassembled completely by robot, so that the function carrier 3 can be supplied together with the preassembled add-on parts to the assembly line. The shaft-like structural space 37 in the vehicle door according to the invention between its outer skin 4 and the outer side of the function carrier 3 can advantageously be kept particularly narrow, since an uncurved shaft section is no longer required for the window lifting and lowering operation.

This is only possible because the invention makes use of a window lifting and lowering system which has a curved construction corresponding to the curvature of the vehicle door 5 and its side window 3', as is shown only by way of principle below in a schematic exemplary embodiment with reference to FIGS 10 to 12. The curved structure of the window lifting and lowering device 42 according to the invention that is matched to the curved structure of the function carrier is shown in vertical section in FIG. 10. Only the lower end of the curved windowpane 3' is illustrated here, said end engaging in a horizontal, u-shaped retaining rail 40 which is connected via a connecting part 41 to a window lifting and lowering device 42.

Figure 12:
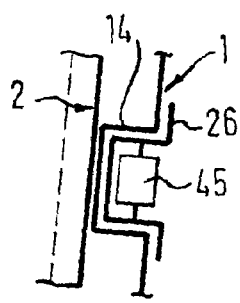
FIG. 12 shows a horizontal section through a section of a two-shell function carrier according to the invention with one of two parallel guide rails for the side window lifting and lowering system according to FIG. 10 within a groove of the outer profile of the outer shell of the function carrier.
Figure 13:
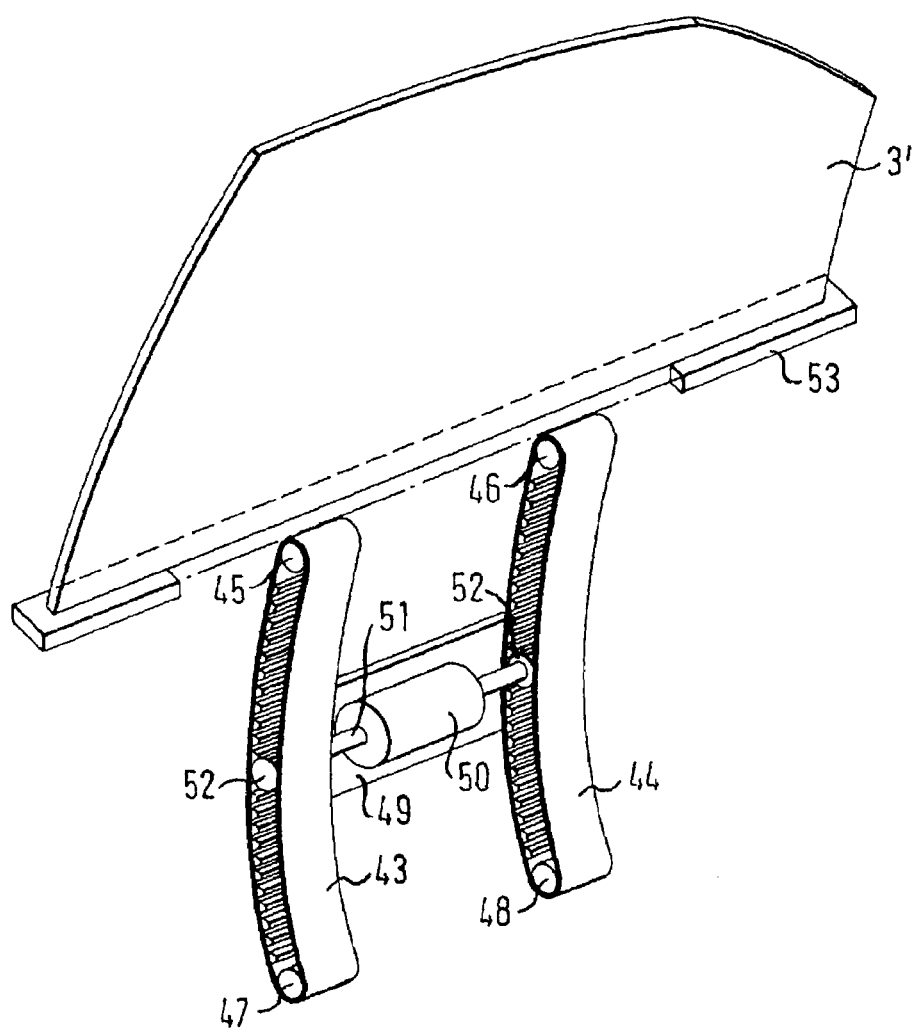
FIG. 13 shows a structural unit of a side window lifting and lowering system according to the invention from FIGS. 10 to 12 in conjunction with a curved side pane and an upper covering of the curved vehicle door in the region of the side windowpane.

The window lifting and lowering device 42 comprises two toothed belts 43, 44 which run via upper and lower deflection pulleys 45, 46 and 47, 48 in the curved, parallel guide rails 26, 27 (FIG. 1) which are at a selected distance from each other and are inserted in parallel, outer profile grooves 14 and 22 (FIG. 8), only the outer groove 14 of which is shown in FIG. 12, in horizontal section. The relatively wide distance between the grooves 14 and 22 for holding the guide rails according to FIG. 8 may also be selected to be substantially shorter, as FIG. 13 shows.

Identical connecting parts 41 are present in each case on the u-shaped retaining rail 40 (FIG. 10) for holding the lower window edge 3', said connecting parts being used to fixedly connect the rail 40 to the parallel toothed belts 43, 44. The parallel belts 43, 44 are connected fixedly parallel to the retaining rail 40 by means of a securing means 49 (FIG. 13), for example in the form of a plate.

The securing means 49 is used for fastening a driving motor 50 to a motor shaft 51 which bear a respective pinion 52 at its ends on both sides for driving the two toothed belts, the pinions 52 lying in each case within the toothed belts 43, 44, which are guided over the upper and lower deflection pulleys 45, 46 and 47, 48, and engaging in each case with their teeth in the opposite grooves of the toothed belts 43 and 44.

Figure 10:
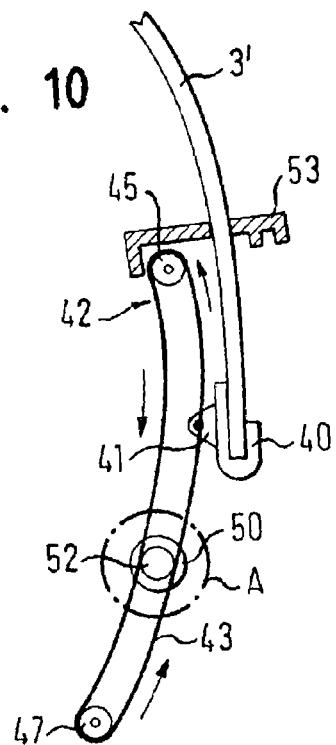
FIG. 10 shows a vertical section through a motor-driven side window lifting and lowering system according to the invention which is matched to the curvature of the function carrier and to the correspondingly curved side window.
Figure 11:
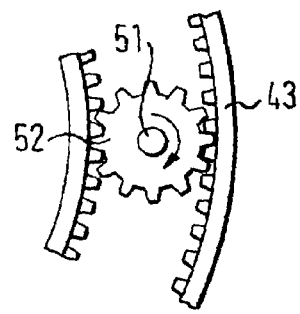
FIG. 11 shows a section A from FIG. 10 in an enlarged illustration.

In order to lift and lower the curved windowpane in the retaining rail, the two toothed belts 43 and 44 are driven synchronously via the two pinions 52, the one pinion 52 of which is illustrated within a toothed belt section on an enlarged scale in FIG. 11 in comparison to FIG. 10. During the lifting and lowering of the windowpane 3', the toothed belts run in each case on the bottom of the guide rails which have rectangular cross sections. The two parallel guide rails 26 and 27 are furthermore connected fixedly at their upper ends to a covering frame 53 with a sealed slot for the windowpane, the covering frame being used to cover the installation shaft 37 (FIG. 9) between the outer skin 4 of the vehicle door 5 and the function carrier 3, which has two shells in the example, in a sealed manner.

To install the window lifting and lowering device 42 according to the invention, the two guide rails 26, 27 are already preassembled together with the integrated toothed belts and its upper and lower deflection pulleys 45, 46 and 47, 48, which are mounted rotatably in the guide rails, and are connected in the form of a structural unit to the u-shaped retaining rail 40 of the windowpane 3' via the connecting parts 41. In addition, the upper ends of the guide rails 26, 27 are connected fixedly to the covering frame 53, and a securing means 49 for the motor 50 is mounted in a fixed manner between the guide rails 26, 27, the two pinions 52 of which securing means, which are driven by the motor, engaging in the parallel toothed belts 43, 44.

The entire preassembled structural unit comprising covering frame 53, guide rails 26, 27 with the integrated toothed belts 43, 44 and the deflection pulleys 45, 46 and 47, 48, the securing means for the motor 50 and the retaining rail 40 for the windowpane 3' is inserted as a whole from above into the installation shaft 37, the covering frame 53 closing off the installation opening between the outer skin 4 of the vehicle door 5 and the function carrier 3, and the guide rails 26, 27 coming to lie in the selected profiled grooves 14 and 22 on the outer side of the function carrier and being connected fixedly to them. In this case, the guide rails 26, 27 engage in each case with a sufficient amount of play in the profiled grooves 14, 22 prior to fastening taking place, in order to be able to make an adjustment.

It is clear that the motor 50 can also be fitted on the inner side of the function carrier, and the motor drive shaft, which is guided in a water-tight manner through the function carrier, synchronously drives the two pinions 52 via a gear mechanism (not illustrated) which is supported by the securing means 49.

The invention is not restricted to the exemplary embodiment which suggests to the expert a multiplicity of modifications which act in an identical manner and which all lie within the scope of the present invention.

The function carrier according to the invention which is curved in accordance with the curved design of the vehicle door and the side window may thus also consist of plastic and has intersecting fiber structures in at least two parallel planes for stiffening purposes. For this purpose, it may also consist of at least two plastic shells which bear against one another in a sandwich-like manner and are connected fixedly to one another to form a unit, the parallel fiber reinforcements in the one plastic shell running transversely to the parallel fiber reinforcement in the adjacent plastic shell.

In addition, the plastic shells in the abovementioned sense may additionally be stabilized by stiffening sections forming three-dimensional profiles. In this case, the profiles on the outer side of the door are designed in each case in such a manner that the window lifting and lowering system can be integrated at least in part of the profile, the window lifting and lowering system being matched precisely in a space-saving manner to the curved structure of the function carrier.

The invention claimed is:

1. An outwardly curved vehicle door providing occupant protection from a lateral impact against the vehicle door, comprising:
    a function carrier having a curvature substantially equal to the curvature of said vehicle door and being composed of at least inner and outer shell bodies each having a curvature substantially equal to the curvature of said vehicle door;
    each of said shell bodies being provided with at least two stiffening indentations on an inner side of said shell body, at least one of said indentations of one of said shell bodies extends generally perpendicular to at least one of said indentations of said other of said shell bodies and overlaps said at least one of said indentations of said one of said shell bodies at a crossing point, said crossing point forming a fastening point for fastening said shell bodies so that said fastened shell bodies from together a continuously closed frame of said function carrier;

a curved outer covering forming, together with a curved outer side of said function carrier, a correspondingly curved installation space for a curved windowpane lifting and lowering device which also has a curvature substantially equal to the curvature of said vehicle door;

two guide rails each having a curvature substantially equal to the curvature of said vehicle door; the windowpane lifting and lowering device comprises at least two toothed belts which have a curvature substantially equal to the curvature of the vehicle door and are guided via upper and lower deflection pulleys the guide rails are adapted to be accommodated in two of said stiffening indentations of said outer shell body, the lifting and lower device further includes driven pinions which are synchronously engaging in the toothed belts for providing upward and downward movement of a windowpane, and a retaining rail at a lower end of the windowpane being connected to the toothed belts for the upward and downward movement of the windowpane.

2. The vehicle door as claimed in claim 1, characterized in that the guide rails the toothed belts, a motor drive for the toothed belts, the retaining rail, and a covering frame for covering an opening between the outer covering of the door and the function carrier, form a structural unit for insertion into the installation space.

3. The vehicle door according to claim 1, wherein said shell bodies are welded, glued, riveted, or clinched at said crossing point.

4. An outwardly curved vehicle door providing occupant protection from a lateral impact against the vehicle door, comprising:

a function carrier having a curvature substantially equal to the curvature of said vehicle door and being composed of at least inner and outer shell bodies each having a curvature substantially equal to the curvature of said vehicle door;

each of said shell bodies being provided with at least two stiffening indentations on an inner side of said shell body, at least one of said indentations of one of said shell bodies extends generally perpendicular to at least one of said indentations of said other of said shell bodies and overlaps said at least one of said indentations of said one of said shell bodies at a crossing point, said crossing point forming a fastening point for fastening said shell bodies so that said fastened shell bodies form together a continuously closed frame of said function carrier;

a curved outer covering forming, together with a curved outer side of said function carrier, a correspondingly curved installation space for a curved windowpane lifting and lowering device which also has a curvature substantially equal to the curvature of said vehicle door, and two guide rails provided at the outer side of said function carrier for said curved windowpane lifting and lowering device, wherein said indentations of said outer shell body run vertically and said indentations of said inner shell body run horizontally, and two of said vertical indentations of said outer shell body receive said guide rails for said windowpane lifting and lowering device.

5. The vehicle door according to claim 4, wherein frames of both of said shell bodies jointly form said frame of said function carrier, wherein said frame of said function carrier is substantially watertight.

6. The vehicle door according to claim 4, wherein said shell bodies are formed from one of an aluminum, a steel, and a plastic sheet.

7. The vehicle door according to claim 4, which further comprises a filling material provided in at least one gap between said outer covering and said outer side of said function carrier.

8. The vehicle door according to claim 4, which further comprises a filling material provided in a gap between an inner covering and an inner side of said function carrier and providing vehicle occupant protection.

* * * * *